H. L. VAN VALKENBURG.
CONTROLLER FOR ELECTRIC GEAR SHIFTS.
APPLICATION FILED JAN. 2, 1918.

1,316,123.

Patented Sept. 16, 1919.
5 SHEETS—SHEET 1.

UNITED STATES PATENT OFFICE.

HERMON L. VAN VALKENBURG, OF MILWAUKEE, WISCONSIN, ASSIGNOR TO INDUSTRIAL CONTROLLER COMPANY, OF MILWAUKEE, WISCONSIN, A CORPORATION OF WISCONSIN.

CONTROLLER FOR ELECTRIC GEAR-SHIFTS.

1,316,123.     Specification of Letters Patent.      Patented Sept. 16, 1919.

Application filed January 2, 1918. Serial No. 210,044.

*To all whom it may concern:*

Be it known that I, HERMON L. VAN VALKENBURG, a citizen of the United States, residing at Milwaukee, in the county of Milwaukee and State of Wisconsin, have invented a certain new and useful Improvement in Controllers for Electric Gear-Shifts, of which the following is a specification.

My invention relates to clutch control and gear shifting apparatus commonly called "magnetic gear shifts" and intended primarily for motor vehicles propelled by internal combustion engines. In order to explain the invention, I have shown it in connection with certain mechanical elements shown in Batsner Patent, No. 1,127,581, issued February 9, 1915. It will be understood, however, that my present invention is not limited to use in connection with the particular form of these mechanical elements herein illustrated. As a result of my invention, I have attained a number of objects some of which may be briefly mentioned, and others of which will be best understood by reference to the following detailed description. Among other things, I have produced a new electric system and provided new controlling mechanism with the result that I have greatly reduced the demands upon the battery: in fact, I have made it practical to operate upon a battery of about half the capacity required for the type shown in the said Batsner patent. I have also reorganized the physical construction and principle of operation of the controlling mechanism, greatly simplifying it, and am able by the aid of a single controlling lever and manually operated switch to accomplish what previously required the manual operation of a plural number of separate elements. Another object of the invention is to provide an improved type of dial or indicator plate and controller handle for plainly indicating the proper positions of the handle for effecting the various shifts, and for interlocking the parts so that the handle cannot close the master switch and actually start the action of the apparatus unless the handle is correctly positioned. Contributory objects will become apparent as the description proceeds.

I obtain my objects by the mechanism illustrated in the accompanying drawings, in which:

Fig. 1ª shows the top of the gear box having the usual H-shaped slot in which the gear shift lever works.

Figs. 2ª, 3ª, 4ª and 5ª are views associated with Figs. 2 to 5, respectively, and illustrating the positions of the gear shift lever, occurring as a result of the action and reactions involved in the figures with which they are associated.

Figs. 2ᵇ and 3ᵇ show the drum controller diagrammatically opposite to the stationary contacts of Figs. 2 and 3, respectively.

Similar numerals refer to similar parts throughout the several views.

Figures 1, 1A:
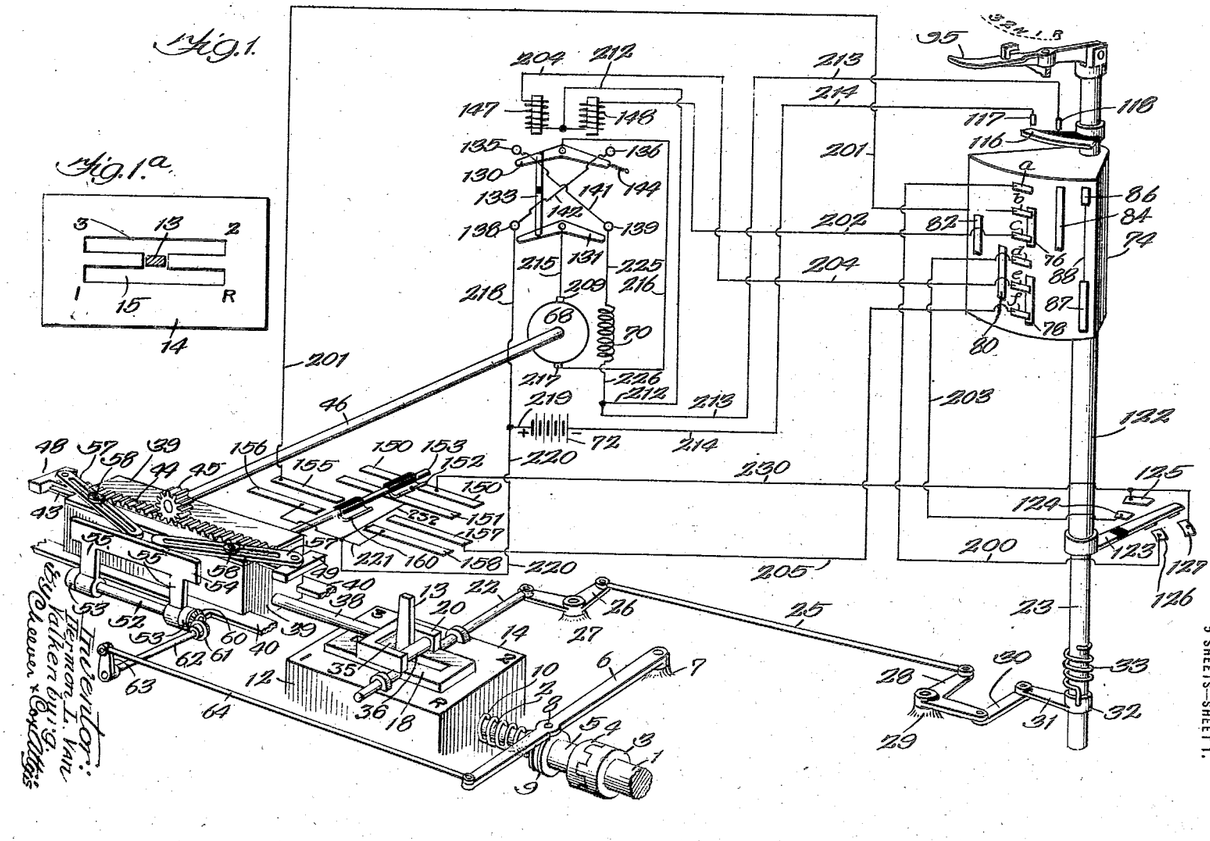
Figure 1 is a general view, partly mechanical, and partly diagrammatic, showing the system as a whole.

The invention may be most readily understood by referring chiefly to the diagrams, Figs. 1 to 5, inclusive, supplementing the description by reference to the physical forms shown in the remaining figures. The engine shaft 1, best shown in Fig. 1, is connected to the transmission shaft 2 through a clutch which is here shown diagrammatically to consist of two interengageable parts 3 and 4, the part 3 being fast on shaft 1 and part 4 being fast upon a sleeve 5, which is shiftable on shaft 2 and controlled by a lever 6, having a stationary fulcrum 7 and provided with a pin 8 which enters the slot of a collar 9 integral with sleeve 5. A spring 10 urges the shiftable parts 4, 5, 9 into engagement with clutch part 3. The result is that normally the clutch is "in," but may be thrown out by operating the lever 6. The change speed gears are of ordinary type and inclosed within a box or casing 12. The gears are shifted by the gear shift lever 13. The gear case top 14, shown separately in Fig. 1ª, has the usual H slot 15. The parts thus far described conform to standard practice and to the construction shown in the aforesaid patent.

Lever 13 is shifted to one side or the other of slot 15 by a link 18 which slides upon the top of the gear case 12. Said link is operated manually, while the fork 20, which moves the lever lengthwise in the slot is operated electrically. Link 18 is operated by a shifting rod 22 which is operated through the agency of a suitable mechanism from the shaft 23. In the particular form shown, rod 22 is connected to a rod 25 by a bell crank 26 having a stationary fulcrum 27. Rod 25 is connected by a bell crank 28 having a stationary fulcrum 29 to a link 30 which, in turn, is connected to the free end of a lever 31. Said lever has a collar 32 which encircles shaft 23. Said collar is not movable lengthwise of the shaft but is loose upon it to enable the shaft to have a limited angular movement independent of the shaft. This permits overtravel of the shaft for the purpose hereinafter described. The shaft and lever are connected by a spring 33 so that a movement of the shaft in either direction yieldingly urges the lever in the same direction.

The fork 20, mentioned, has antifriction rollers 35, 35 mounted in it, these rollers engaging the gear lever 13 between them for moving it. The fork is operated by a rod 38 fastened to a main slide 39 which travels upon guides 40. Longitudinally slidable upon the main slide is a primary slide 43 having a rack 44 upon its top engaged by a pinion 45 fastened on the motor shaft 46. The primary slide is longer than the main slide, to admit of lost motion between them. The primary slide has cross-heads 48 and 49 at the ends and the result is that after the motor pinion starts to rotate (assuming that the primary slide is in "symmetrical" position,—that is, with its two ends projecting equal distances beyond the ends of the main slide), the primary slide will move until the crosshead reaches the end of the main slide, whereupon the main slide will be forced to travel in unison with the primary slide. The purpose of the lost motion or independent and initiatory movement of the primary slide is to insure that the clutch will always be thrown "out" prior to the actual shifting of the gears. The clutch is operated by a rock shaft 52 which is journaled in stationary bearings 53. Said shaft is rocked by a push plate 54 which has arms 55 fastened to said shaft. Said plate is in position to be engaged by the ends of two slotted levers 57. The opposite ends of said levers are pivotally fastened to the ends of the primary slide and between their ends the levers are fulcrumed upon studs 58 which are fastened to the main slide and pass up through the slots in the levers. The rock shaft 52 has a bevel gear wheel 60 which meshes with a gear wheel 61 on a shaft 62 which operates a crank 63 which is connected at its free end to a rod 64 which is connected to the free end of the clutch lever 6. The construction is such that as soon as the primary slide commences to move relatively to the main slide, it increases the angularity of one of the slotted levers 57 and this pushes the plate 54 in a direction to throw out the main clutch 3, 4. It will be noted that it is immaterial, so far as the push plate is concerned, what position the main slide is in so long as the primary slide is in "symmetrical" position relatively to the main slide. In consequence the clutch may be "in" or it may be "out" for any one of the three positions of the main slide (corresponding to neutral, reverse or first speed positions of the gear lever 13). The condition of the clutch will depend solely on the position of the primary slide relatively to the main slide. The motor, whose armature 68 rotates shaft 46, is strong enough, when energized, to throw out the clutch in spite of the opposition of the clutch spring 10; but said spring is strong enough, when the motor is not energized, to throw the clutch back "in," at the same time actuating the clutch lever 6 to throw the push plate 54 toward the main slide and through the agency of the slotted levers replace the primary slide in symmetrical position, incidentally forcing the motor armature to rotate the necessary amount.

I have now described what, for the sake of identification, may be termed the "gear shifter" (by which I mean more especially the parts mounted upon the gear box 12) and the "clutch operating and shifter operating device" (by which I mean more especially the main and primary slides and the parts intimately associated therewith). I will now describe that part of the apparatus which is more essentially electrical in its nature, including, however, the hand lever, which performs both electrical and mechanical functions. Generally speaking, the more essentially electrical portion comprises a motor, automatic and manual switches, a battery or other source of electric energy, and a manually operated controller which in the form illustrated is of the drum type.

The motor has a series field coil 70 and a source of energy 72 which latter, in the case of a motor vehicle, is a storage battery. The manually operated controller is here shown as of the drum type and coöperates with a set of stationary contacts, a, b, c, d, e and f. The drum 74 has five sets of contacts. At the position corresponding to neutral, it has two contacts 76 and 78. Contact 76 is adapted to engage and electrically connect stationary contacts b and c. Contact 78 is adapted to engage and electrically connect stationary contacts e and f. At the position corresponding to first speed, the drum has a contact 80 adapted to engage and electrically connect stationary contacts d, e and f. At the position corresponding to "reverse", the drum has a contact 82 adapted to engage and electrically connect the stationary contacts c and d. At the position corresponding to second speed, the drum has a contact 84 adapted to engage and electrically connect stationary contacts a, b and c. At the position corresponding to third speed, the drum has a contact 86 adapted to engage stationary contact a. It also has a contact 87 which is electrically connected to contact 86 by a conductor 88 and is adapted to engage and electrically connect stationary contacts e and f.

Figures 6, 7, 8:
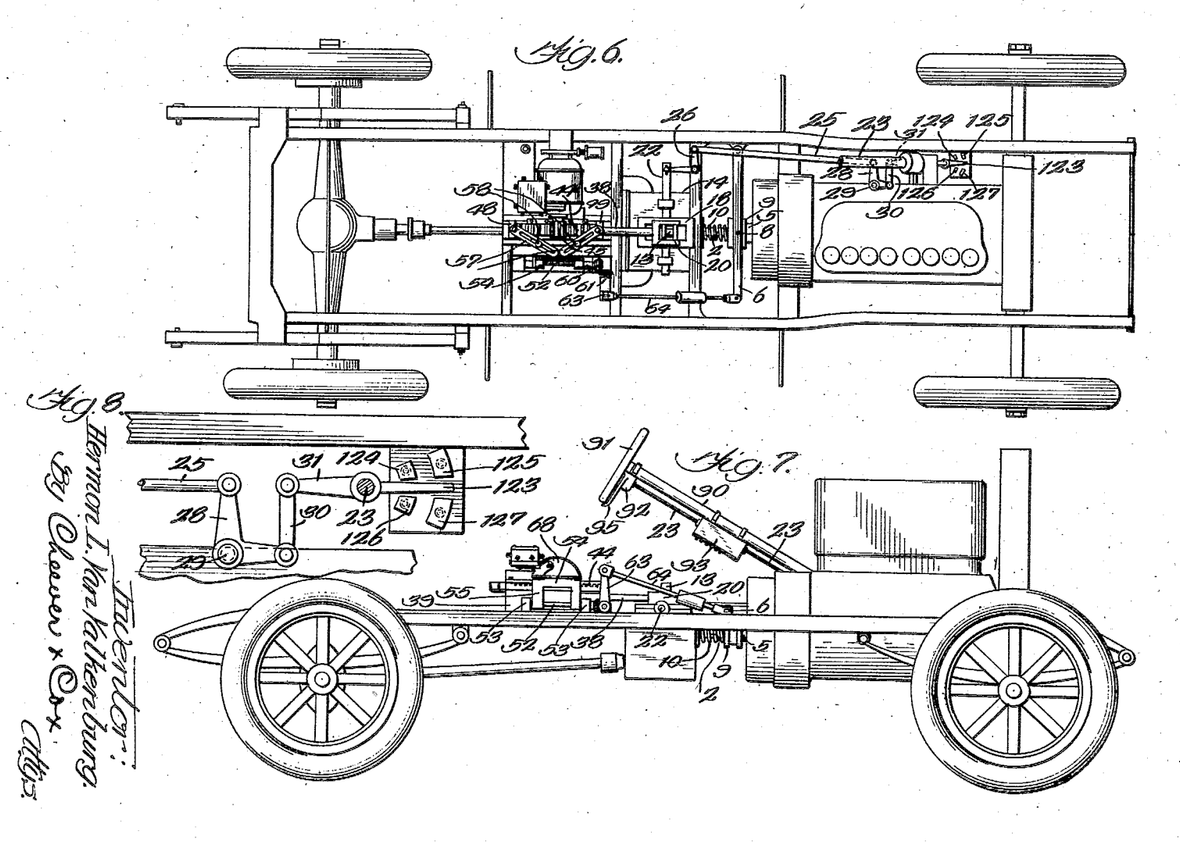
Figs. 6 and 7 are plan and side views, respectively, of the chassis and running gear of an automobile equipped with my invention.
Fig. 8 is a fragmental view showing the control rod and some of the parts operated thereby.
Figures 9, 10:
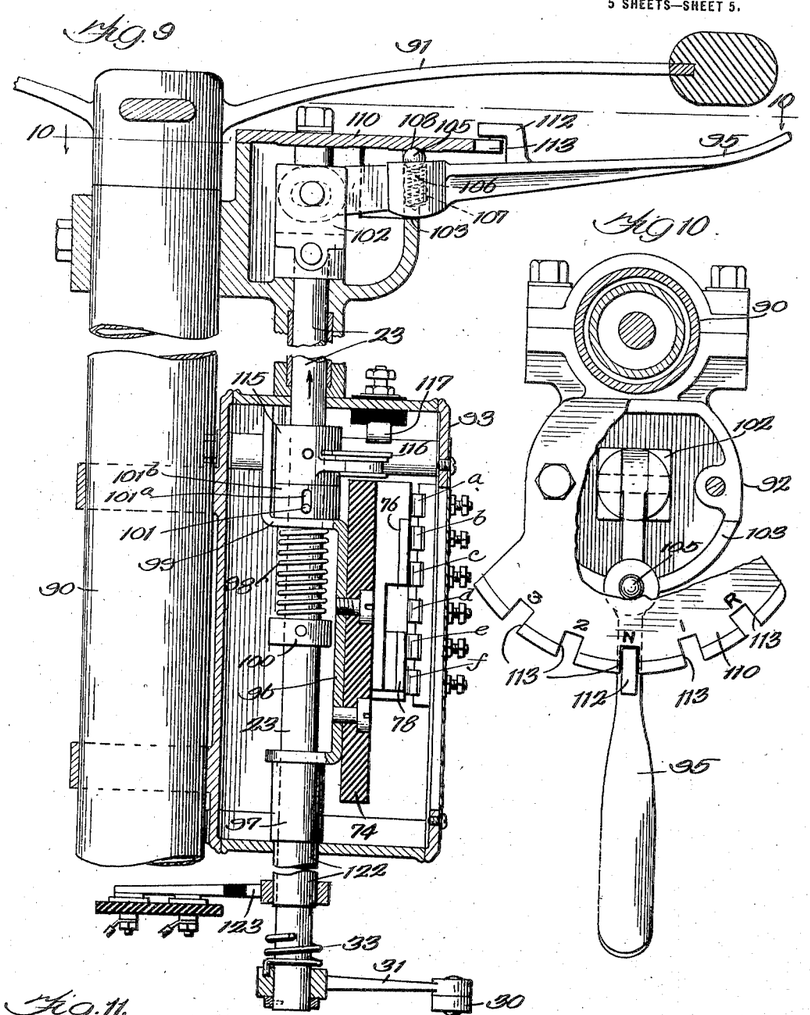
Fig. 9 is a vertical section of the drum controller and manually operated control lever and associated parts mounted in position upon the steering column of a motor vehicle.
Fig. 10 is a plan section on the line 10—10, Fig. 9.
Figure 11:
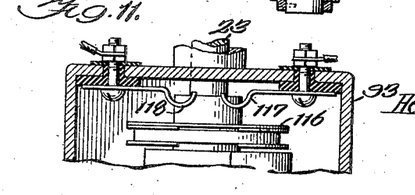
Fig. 11 is a fragmental sectional elevation showing the contacts and associated parts near the upper part of the housing which incloses the drum controller. The view is taken looking toward the left in Fig. 9.

The drum is rotated by and associated with mechanism which will be best understood by reference to the physical parts shown in Figs. 9, 10 and 11. The shaft 23, previously mentioned is arranged parallel and adjacent to the steering column 90 at the top of which is the steering wheel 91. Said shaft has a bearing near the top in a housing 92 secured near the top of the steering column and near the bottom in a housing 93 which is secured lower down on the steering column. The arrangement is shown also in Fig. 7. The shaft is vertically movable through the medium of the controller handle 95, but the drum 74, which is rotated by the shaft, is not vertically movable, being held and supported by a bracket 96 which at the upper end abuts the roof of housing 93 and at the bottom abuts the collar 97 which rests upon the floor of the housing. The shaft is normally held down by a spring 98 which at the upper end abuts a bend 99 in bracket 96 and at the bottom seats upon a collar 100 fastened to the shaft. The rotation of the shaft is imparted to the drum 74 by a pin 101 which works in a vertical slot 101ᵃ formed in a collar 101ᵇ which is loose upon the shaft but fastened to the bracket 96.

The controller handle is connected to the shaft by a knuckle 102 so constructed that an angular movement of the handle will rotate the shaft and a depression of the outer end of the handle will raise the shaft. The handle fulcrums upon the lip 103 formed in housing 92. Said lip extends horizontally and is concentric with the shaft so that the handle may slide upon it to any one of its five stations or operative positions. The handle is yieldingly held at any one of its stations by a spring ball lock comprising a ball 105 seating upon a helical spring 106 contained in a socket 107 in the top of the handle. A series of shallow pockets 108 is formed on the bottom of the dial plate 110, one at each of the stations, and when the handle arrives at the station, the ball snaps into the corresponding pocket, but a slight lateral pressure on the handle will force the ball back out of the pocket and release the handle. The dial plate, which, in the present case forms the cover of the housing 92, not only indicates the positions which the controller handle must be brought to to make the desired shift, but prevents the depression of the handle, except at the proper stations, for making the shift. The handle has a lug 112 on top which extends up over the circular edge of the dial and prevents the depression of the handle except when the lug comes over one of the notches 113 which are placed at the proper stations.

Rigidly fastened to shaft 23 is a collar 115 which carries a connector plate 116 adapted to bridge and electrically connect the contacts 117 and 118. These parts are shown more or less diagrammatically at the upper right corner of Fig. 1: mechanically in Fig. 11 and diagrammatically near the bottom of each of Figs. 2 to 7. The contacts in their actual mechanical form are stationary and located above and out of engagement with the plate when the shaft is down in normal position. In the design shown, they are mounted on the under side of the roof of the housing 93. The last step on the part of the operator when making a gear shift is to close this switch 116 by raising it by the aid of the controller handle. For the sake of identification, therefore, it may be termed the "master switch".

The sleeve 97, previously mentioned, and shown mechanically in Fig. 9 is rigidly fastened to the rotatable but vertically fixed bracket 96. It has an extension 122 passing down through an opening in the floor of housing 93. At the lower end an arm 123 is fastened to it, said arm having its outer end insulated from its inner end, and serving to electrically connect the associated contacts in pairs. The parts are so arranged that when the shaft (and consequently the arm) is in neutral position, the arm will be out of engagement with any contacts but when in "first" or "reverse" position, it will connect the contact 124 to the contact 125 and when in "second" or "third" position, it will connect the contact 126 with the contact 127. To aid identification, this arm may be called the "selector switch".

The direction in which the motor rotates is controlled by a reversing switch which is shown diagrammatically in Figs. 1 to 5. In the form shown, this switch has two arms 130 and 131 having stationary fulcrums at the center and mechanically connected by a link 133. This link causes the two arms to move in unison about their fulcrums but insulates them from each other. Said switch arms are of conductive material. The arm 130 engages the stationary contact 135 when it is in one extreme position and the contact 136 when it is in the other extreme position. Arm 131 engages stationary contact 138 when it is in one extreme position and 139 when it is in the other extreme position. The contacts 135 and 139 are connected by the conductor 141 while the contacts 136 and 138 are connected by a conductor 142. A spring 144 holds the switch arms normally out of engagement with any of the contacts.

Said reversing switch is operated electromagnetically. In the diagrammatic form shown, there are two windings 147 and 148. When the winding 147 is energized, it will cause the arms 130 and 131 to engage the contacts 135 and 138 respectively, and when the winding 138 is energized, it will cause the arms to engage the contacts 136 and 139, respectively.

In addition to the manually operated drum controller, the apparatus includes what is practically an automatic controller. This has a pair of stationary contacts 150, 151 which are bridged by a switch or connector 152 carried on a rod 153 fastened to and operated by the main slide 39. Arranged parallel with said contact but out of line therewith are two other pairs 155 and 156, and 157 and 158 adapted to be bridged by the switch or connector 160 which is also carried by rod 153. When the slide is at neutral, the contacts 150 and 151 will be connected. When the slide has left neutral in one direction it will bridge contacts 155 and 156. When it has left neutral in the opposite direction, it will bridge the contacts 157 and 158. The stationary contacts overlap so that the contacts 155 and 156 will be bridged before the switch 152 has left the pair 150 and 151. The same is true with respect to contacts 157 and 158.

For simplicity, the conductors in the diagrams 2 to 5 are somewhat condensed, although connected upon the same principle as in the general layout shown in Fig. 1. Referring now to the connections, the stationary contact $a$ is connected by conductor 200 to the stationary contact 126 of the selector switch. Contact $b$ is connected by conductor 201 to contact 155 of the automatic controller. Contact $c$ is connected by conductor 202 to the winding 148. Contact $d$ is connected by conductor 203 to the contact 124 of the selector switch. Stationary contact $e$ is connected by the conductor 204 to the winding 147. Contact $f$ is connected by the conductor 205 to the stationary contact 157 of the automatic controller. A conductor 212 leads from the remaining ends of the windings 147 and 148 to the conductor 213 which leads to the contact 118 of the master switch. The remaining terminal 117 is connected to the negative terminal of the battery by the conductor 214. The terminal 209 of the motor is connected to switch arm 131 by a conductor 215. The switch arm 130 is connected by a conductor 216 to the remaining motor terminal 217. Stationary contact 138 of the reversing switch is connected by a conductor 218 to a conductor 219 which leads to the positive terminal of the battery and also to the conductor 220 which leads to the conductor 221 which electrically connects the stationary contacts 156 and 158 to the automatic or motor controlled controller. The terminal 139 is connected by a conductor 225 to one end of the series coil 70. The other end of said coil is connected by a conductor 226 to the conductor 212 and the conductor 213. Contact 150 is connected by a conductor 230 to the terminals 125 and 127 of the selector switch, while contact 151 is connected to conductor 221 by a conductor 232.

Operation: The mechanical elements which actuate the gear shift lever 13 and the clutch 3, 4 have already been described. It is sufficient to repeat that the link 18 which shifts the lever from one side of the H slot to the other through the connecting gate is actuated manually by the controller handle 95 which rotates the shaft 23 and is yieldingly connected by spring 33 to links and levers which shift the link 18 in the direction which, for identification, may be referred to as "transverse." As a result of the yielding connection between the controller handle and the link 18, transverse pressure may be exerted upon the gear lever 13, while said lever is at the end of the slot, and when the lever arrives at the gate this pressure will force the lever through the gate and permit the lever to continue its movement in the opposite side of the slot without necessitating the stoppage or slowing down of the motor. The gate is wide enough to permit this action and consequently, by a single setting of the controller handle, the gears may be shifted from first to second speed. Said gear lever 13 is moved longitudinally by the main slide 39 actuated by the primary slide 44 which is actuated by the motor and serves to throw the clutch 3, 4 in and out at the proper time.

Let it be assumed that the parts start at neutral, as shown in Fig. 1 and that a rotation of the motor in a clockwise direction will cause the gear lever 13 to move from neutral to first speed. With the master switch 116 open, as it normally is, when the motor vehicle is not in motion, neither of the windings 147, 148 of the reversing switch will be energized and hence said switch will assume neutral or open position, as shown in Fig. 1. The selector switch arm 123 will also be in neutral, open position, as will the controller handle 95. The rod 153 will be in neutral position and cause the switch 152 of the automatic controller or motor-controlled switch to electrically connect the contacts 150, 151.

Figures 2, 2A, 2B:
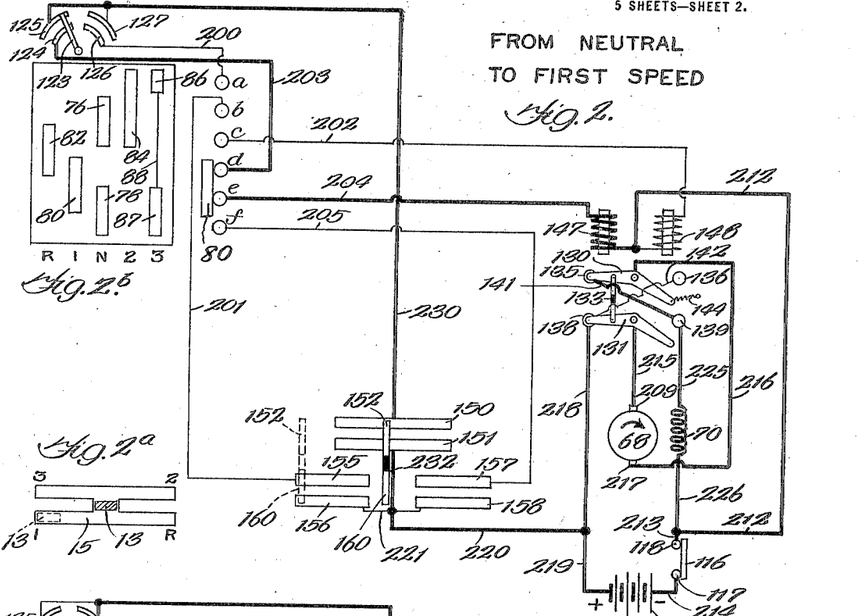
Figs. 2 to 5, inclusive, are diagrams illustrating the principle of operation of the apparatus.
Figures 3, 3A, 3B:
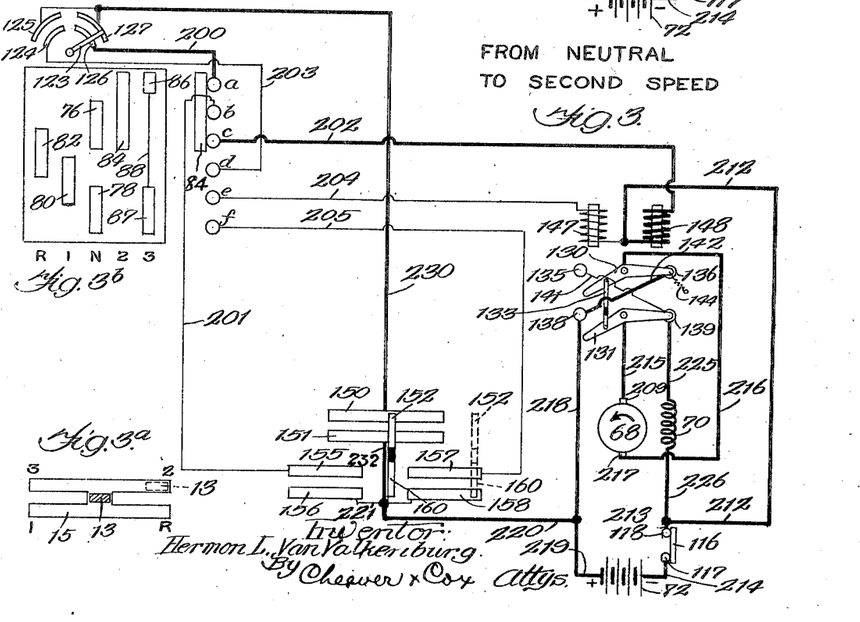

Now, let it be assumed that it is desired to shift from neutral to first speed: The operator first rotates the controller handle 95 to first speed position, which is opposite the first notch at the right of central position, Fig. 10. This act rotates shaft 23 in such direction that the connecting links and levers will cause the shifting link 18 to move the gear lever 13 to the side of the H slot corresponding to first speed. The same act rotates the drum controller 74 to first speed position and thus causes the contact 80 to connect the stationary contacts $d$, $e$ and $f$, as shown in the diagram, Fig. 2. The same movement causes the arm 123 of the selector switch to electrically connect the contacts 124 and 125. The controller is now "set" but nothing happens until the operator depresses the controller handle, thus elevating shaft 23 and bringing the arm 116 of the master switch into electric connection with the terminals 117 and 118. This energizes the winding 147 of the reversing switch through a circuit which may be traced as follows: from the positive terminal of the battery through conductors 219 and 220 to contact 151, thence through switch 152 to contact 150, thence through conductor 230 to contact 125 of the selector switch. The circuit continues through the switch arm 123 to contact 124 and conductor 203 to stationary contact $d$ of the drum controller; thence through contact 80 of the drum controller to stationary contact $e$ and conductor 204 of the winding 147, thence through conductors 212 and 213 to terminal 118, thence through master switch 116 to terminal 117, thence through conductor 214 to the negative terminal of the battery. As soon as the winding 147 is energized, it causes the reversing switch to assume a position shown in Fig. 2, thus closing the motor circuit which may be traced as follows: from the positive terminal of the battery through conductors 219 and 218 to stationary contact 138, thence through switch arm 131 to conductor 215 to motor terminal 209, thence through the armature to the terminal 217, thence through conductor 216, to switch arm 130, to stationary contact 135, to conductor 141, to stationary contact 139, to conductor 225, to series coil 70, to conductor 226, to conductor 213, to contact 118, to switch 116, to contact 117, to conductor 214, to the negative terminal of the battery. The motor circuit being now closed, the armature rotates in a direction to move the main and primary slides 44 and 39 toward the left (Figs. 1 and 2). Referring preferably to Fig. 2, the movement of the main slide causes the connectors 152 and 160 of the automatic controller to move toward the left. As soon as the connector 152 leaves the ends of the contacts 150 and 151, the circuit through the winding 147 is broken, thus permitting the spring 144 to move the reversing switch to normal open position, thus opening the motor circuit. The load on the motor soon causes it to stop, at which time the connector will be in the position shown in dotted lines in Fig. 2. The operator releases the controller handle 95, thus permitting the shaft 23 to drop and open the master switch, the gear shifting action having now been completed and the gears being in "first speed."

Figures 4, 4A:
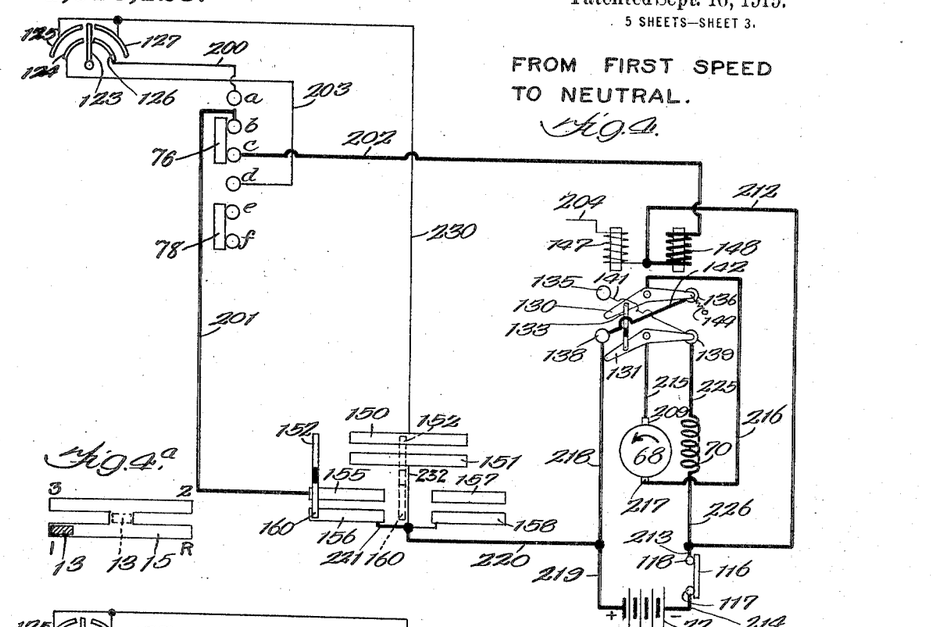
Figures 5, 5A:
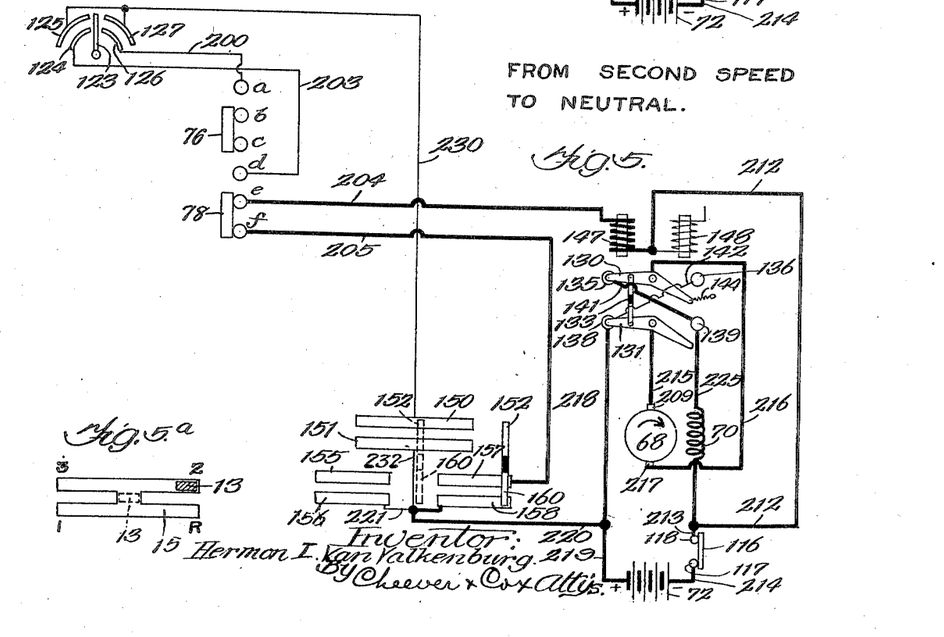

Now, suppose it is desired to shift back again from first speed to neutral: The operation will be readily understood by referring to the diagram, Fig. 4. So long as the vehicle is running at first speed, the connector will remain at the left end of the slot (Figs. 2 and 4). When the operator desires to make the shift to neutral, he first rotates the controller handle to central neutral notch on dial plate 110, which position is shown in Fig. 10. This brings the controller contact 76 into engagement with the stationary contacts $b$ and $c$ and also brings the controller contact 78 into engagement with the stationary contacts $e$ and $f$. The act also brings the arm 123 of the selector switch to neutral, open position, as shown in Fig. 4. The act also mechanically causes the transverse shifting link 18 to exert pressure on the side of the gear lever 13 to yieldingly urge it toward a position halfway between the two longitudinal slots in the guide plate 14. When the operator is ready to have the shifting action occur, he depresses the controller handle 95, as before, thus elevating the shaft 23 and closing the master switch 116. This results in the energization of the winding 148 of the reversing switch through the following conductors: from the positive terminal of the battery to conductor 219, to conductor 220, to contact 156, through connector 160, to contact 155, through conductor 201, through contact $b$, through contact 76, through conductor 202 to the winding 148, thence through the conductor 212 to conductor 213, to contact 118, through master switch 116, to contact 117, through conductor 114, to the negative terminal of the battery. This reverses the position of the reversing switch, thus causing the motor to rotate in the opposite direction and move the connectors 152 and 160 to central position, as shown in dotted lines in Fig. 4. As soon as the connector 160 passes beyond the inner end of the contacts 155 and 156, the circuit through the winding 148 is broken, with the result that the spring 144 automatically returns the reversing switch to normal open position, thus putting the motor on open circuit and causing it to come to rest.

In a similar manner, the gear lever 13 may be shifted from neutral to second speed or two-thirds speed, or back from those speeds to neutral. For example, the motion from neutral to second speed is illustrated by the heavy lines in Fig. 3, it being understood that the operator in positioning the controller handle 95, tensions the spring 33 in such manner as to bring the reversing lever into the proper side of the H-slot and by the same act, causes the arm 123 of the selector switch to assume the position shown in Fig. 3, electrically connecting the contacts 126 and 127. In shifting from second speed to neutral, the arm 123 of the selector switch is first brought to neutral position, and upon the closure of the master switch 116, circuits will be established through the conductor indicated in heavy lines in Fig. 5.

Having thus described my invention, what I claim as new and desire to secure by Letters Patent, is:

1. A gear shifter including a gear-shifting lever having different fields of operation; an electric motor for moving said lever within its fields of operation; a motor controller; mechanism for changing the field of operation of the lever; and a one-piece controller handle, said mechanism and said controller both being operated by said one-piece handle.

2. A gear shifter including a gear-shifting lever; a guide for said lever having two connecting slots in the form of an H; an electric motor for moving said lever longitudinally in said slots; a motor controller; mechanism for moving the lever from one slot to the other, and a one-piece controller handle, said mechanism and said controller both being operated by said one-piece handle.

3. A gear shifter including a gear-shifting lever having different fields of operation; an electric motor for moving said lever in alternate directions in each of its fields of operation; a controller for causing the motor to rotate in either direction to thereby move said lever in either direction in each of the fields of operation of said lever; mechanism for changing the field of operation of the lever; and a one-piece controller handle, said mechanism and said controller both being operated by said one-piece handle.

4. In combination, a gear shifting device, means for actuating said device, a motor for actuating said means, a source of electrical energy for said motor, and a manually controlled, electrically operated switch for controlling the action of said source upon the motor.

5. In combination, a gear-shifting device, an electric circuit including an electric motor for actuating said gear-shifting device; a source of electric energy in said circuit for supplying the motor; an electromagnetic switch for controlling said circuit to determine in what direction the current shall flow from the source to the motor; a second electric circuit which includes the windings of said switch; and a manually operated controller for controlling said second circuit.

6. In combination, a gear shifting device, an electric circuit including an electric motor for actuating said gear-shifting device; a source of electric energy in said circuit for supplying the motor; an electromagnetic switch for controlling said circuit to determine in what direction the current shall flow from the source to the motor; a second electric circuit which includes the windings of said switch; a manually operated controller for controlling said second circuit; and a master switch included in said second circuit adapted to be closed after the controller has been manually positioned whereby said controller may be manually positioned before the electromagnetic switch starts to function.

7. In combination, a gear-shifting device, an electric circuit including an electric motor for actuating said gear shifting device; a source of electric energy in said circuit for supplying the motor; an electromagnetic switch for controlling said circuit, said switch having a plurality of windings and being capable of assuming any of three positions, in one of which the motor circuit will be open, in another the motor will rotate in one direction and in the third position the motor will rotate in the opposite direction; a second electric circuit which includes the windings of said switch; and controlling means for determining which, if any, of said windings shall be energized.

8. In combination, a gear shifting-device, an electric circuit including an electric motor for actuating said gear-shifting device; a source of electric energy in said circuit for supplying the motor; an electromagnetic switch for controlling said circuit, said switch having a plurality of windings and being capable of assuming any of three positions, in one of which the motor circuit will be open, in another the motor will rotate in one direction and in the third position the motor will rotate in the opposite direction; a second electric circuit which includes the windings of said switch; controlling means for determining which, if any, of said windings shall be energized; and a master switch for opening and closing the circuit of said windings.

9. In a gear shifter, a lever for shifting the gears, a motor actuated element for actuating said lever, an electro-magnetic switch for controlling the motor circuit, and controlling means for controlling said switch, said controlling means including a manually operated controlling mechanism, and an automatic controller coöperating therewith, the automatic controller being actuated by said motor.

10. In a gear shifter, a lever for shifting the gears, a motor for actuating said lever, an electromagnetic switch for controlling the motor circuit; and controlling means for controlling said switch, said controlling means including an automatic controller actuated by said motor; a manually operated controller, (such as the drum), and a manually operated switch coöperating with the manually operated controller and with the automatic controller to determine whether or not the automatic controller shall put the motor on open circuit when the automatic controller reaches neutral position.

11. In a gear shifter; a lever for shifting the gears; a motor-actuated element for actuating said lever; a motor circuit including a motor, a source of electric energy therefor, and an electromagnetically controlled reversing switch for ordaining the direction in which the motor shall rotate; a control circuit including a winding for controlling said reversing switch; and manually controlled means for energizing said control circuit.

12. In a gear shifter; a lever for shifting the gears; a motor-actuated element for actuating said lever; a motor circuit including a motor, a source of electric energy therefor, and an electromagnetically controlled reversing switch for ordaining the direction in which the motor shall rotate; a control circuit including a winding for controlling said reversing switch; and means for energizing said control circuit, said means including a manually operated switch, and a switch operated by said motor.

13. In a gear shifter, a lever for shifting the gears; a motor-actuated element for actuating said lever; a motor circuit including a motor, a source of electric energy therefor, and an electromagnetically controlled reversing switch for ordaining the direction in which the motor shall rotate; a plurality of windings and circuits therefor for controlling said reversing switch; and means for selectively energizing said windings.

14. In a gear shifter, a lever for shifting the gears; a motor-actuated element for actuating said lever; a motor circuit including a motor, a source of electric energy therefor, and an electromagnetically controlled reversing switch for ordaining the direction in which the motor shall rotate; a plurality of windings and circuits therefor for controlling said reversing switch; and controlling means for energizing said windings selectively, said controlling means including a manually operated controller, and a controller operated by said motor.

15. In a gear shifter, a lever for shifting the gears; a motor-actuated element for actuating said lever; a motor circuit including a motor, a source of electric energy therefor, and an electromagnetically controlled reversing switch for ordaining the direction in which the motor shall rotate; a plurality of windings and circuits therefor for controlling said reversing switch; a manually operated controller for contributing to the control of said windings; a motor-actuated controller for also contributing to the control of said windings, and a selector switch coöperating with said motor-actuated controller for also contributing to the control of said windings.

16. In a gear shifter, a lever for shifting the gears; a motor-actuated element for actuating the lever; a motor circuit including a motor, a source of electric energy therefor, and an electromagnetically operated reversing switch for ordaining the direction in which the motor shall rotate, said reversing switch normally assuming a position to keep the motor on open circuit; a plurality of windings and energizing circuits therefor for operating said reversing switch; and means for selectively energizing said winding.

17. In a gear shifter, a lever for shifting the gears; a motor-actuated element for actuating the lever; a motor circuit including a motor, a source of electric energy therefor, and an electromagnetically operated reversing switch for ordaining the direction in which the motor shall rotate, said reversing switch normally assuming a position to keep the motor on open circuit; a plurality of windings and energizing circuits therefor for operating said reversing switch; and controlling means for energizing said windings selectively, said controlling means including a manually operated controller and a controller operated by said motor.

18. In a gear shifter, a lever for shifting the gears; a motor-actuated element for actuating the lever; a motor circuit including a motor, a source of electric energy therefor, and an electromagnetically operated reversing switch for ordaining the direction in which the motor shall rotate, said reversing switch normally assuming a position to keep the motor on open circuit; a plurality of windings and energizing circuits therefor for operating said reversing switch; a manually operated controller for contributing to the control of said windings; a motor-actuated controller for also contributing to the control of said windings, and a manually operated selector switch coöperating with said motor-actuated controller for also contributing to the control of said winding.

19. A gear shifter, a lever for shifting the gears, said lever being capable of occupying a "neutral" position and two "running" positions, a motor for actuating said lever, a motor circuit including the motor, a source of electric energy therefor, and an electromagnetically operated reversing switch for the motor circuit, said reversing switch being normally open; two windings and energizing circuits therefor for operating said reversing switch, and controlling means for said energizing circuits, said controlling means including a manually operated controller adapted to be positioned by hand prior to the shifting of the gears, an automatic controller actuated by said motor, and a selector switch mechanically connected to the manually operated controller for determining whether when the gear shifting lever reaches neutral, the circuits through said windings shall be open or closed.

20. A gear shifter, a lever for shifting the gears, said lever being capable of occupying a "neutral" position and two "running" positions, a motor for actuating said lever, a motor circuit including the motor, a source of electric energy therefor, and an electromagnetically operated reversing switch for the motor circuit, said reversing switch being normally open; two windings and energizing circuits therefor for operating said reversing switch, and controlling means for said energizing circuits, said controlling means including a manually operated controller adapted to be positioned by hand prior to the shifting of the gears, an automatic controller actuated by said motor and capable of being moved to a "neutral" and either of two "running" positions, and a selector switch mechanically connected to the manually operated controller and capable of occupying three positions in one of which one of said windings will be on closed circuit, in another position the other winding will be on closed circuit and in the third position, said windings shall both be on open circuit when the automatic controller reaches neutral position.

21. In a gear shifter, a lever for shifting the gears, a guide for the lever having parallel slots with a gate joining them near the middle, a motor adapted to move the lever from one end of the slots to the other, a reversing switch for said motor, a winding for controlling said reversing switch, and means controllably energizing said winding.

22. In a gear shifter, a lever for shifting the gears, a guide for the lever having parallel slots with a gate joining them near the middle, a motor adapted to move the lever from one end of the slots to the other, a reversing switch for said motor, a winding for controlling said reversing switch, and means operated in part manually and in part by the motor for controllably energizing said winding.

23. In a gear shifter, a lever for shifting the gears, a guide for the lever having parallel slots with a gate joining them in the middle, a motor adapted to move the lever in either direction longitudinally from the gate, a reversing switch for said motor, a plurality of windings for controlling said reversing switch, means for selectively energizing said windings, and means for moving said lever transversely through the gate.

24. In a gear shifter, a lever for shifting the gears, a guide for the lever having parallel slots with a gate joining them in the middle, a motor adapted to move the lever in either direction longitudinally from the gate, a reversing switch for said motor, a plurality of windings for controlling said reversing switch, means operated in part manually and in part by the motor for selectively energizing said windings, and means for moving said lever transversely through the gate.

25. In a gear shifter, a lever for shifting the gears, a guide for the lever having parallel slots with a gate joining them in the middle, a motor adapted to move the lever in either direction longitudinally from the gate, a reversing switch for said motor, a plurality of windings for controlling said reversing switch, a controller handle, controlling mechanism actuated in part by the controller handle and in part by the motor for selectively energizing said winding, and means also operated by said controller handle for moving the lever transversely through the gate.

26. In a gear shifter, a lever for shifting the gears, a guide for the lever having parallel slots with a gate joining them in the middle, a motor adapted to move the lever in either direction longitudinally from the gate, a reversing switch for said motor, a plurality of windings for controlling said reversing switch, a controller handle, controlling mechanism actuated in part by the controller handle and in part by the motor for selectively energizing said winding, and spring mechanism operative throughout the movement of the lever longitudinally toward the gate for urging said lever transversely to pass through the gate when the gate is reached.

27. In a gear shifter, a lever for shifting the gears, a guide for the lever having parallel slots with a gate joining them in the middle, a motor adapted to move the lever in either direction longitudinally from the gate, a reversing switch for said motor, a plurality of windings for controlling said reversing switch, a controller handle, controlling mechanism actuated in part by the controller handle and in part by the motor for selectively energizing said winding, and spring mechanism operative throughout the movement of the lever longitudinally toward the gate for urging said lever transversely to pass through the gate when the gate is reached, said spring mechanism being capable of being "set" by said controller handle.

28. In mechanism of the class mentioned, a motor for shifting the gears, an electromagnetic reversing mechanism having a pair of windings with their circuits for controlling said reversing mechanism, a controller for the circuits of said windings, said controller having stationary and movable contacts coöperating with each other for selectively energizing said windings, the movable contact being moved by the motor and capable of occupying a neutral and two "running" positions; and a selector switch for determining which of said windings shall be energized when said movable contact is in neutral position.

29. In mechanism of the class mentioned, a motor for shifting the gears, an electromagnetic reversing mechanism having a pair of windings with their circuits for controlling said reversing mechanism, a controller for the circuits of said windings, said controller having stationary and movable contacts coöperating with each other for selectively energizing said windings, the movable contact being moved by the motor and capable of occupying a neutral and two "running" positions; and a selector switch capable of occupying an open circuit position and either of two closed circuit positions for determining which, if either, of said windings shall be energized when said movable contact is in neutral position.

30. In mechanism of the class mentioned, a motor for shifting the gears, the motor circuit being controlled by a reversing switch, which normally holds the motor on open circuit; two electro-magnets, one for moving the reversing switch to one "running" position and the other for moving it to the other "running" position, each of said magnets having a winding and a circuit therefor, a controller for the circuits of said windings, said controller having stationary contacts, and an automatic switch coöperating therewith which is actuated by the motor, said automatic switch being capable of assuming a "neutral" and two "running" positions; and a selector switch for determining which, if either, of said windings shall be energized when the automatic switch is in neutral position.

31. In a gear shifter, a motor for operating the gear shifting mechanism; a controller for said motor; a master switch for causing the motor to start; and a handle capable of two kinds of movement, one for setting the controller and the other for operating the master switch to thereby cause the motor to start after the controller has been set.

32. In a gear shifter, a gear shifting lever; an electric motor for actuating the lever; a controller for said motor; a source of electrical energy for the motor; a master switch for causing said source to energize the motor, and a controller handle adapted to position both the controller and the master switch, said handle being movable for the purpose in two planes transverse to each other.

33. In a gear shifter, a motor for operating the gear shifting mechanism; a controller for said motor; a master switch for causing the motor to start; a controller handle rotatable sidewise for setting said controller, and movable substantially vertically for operating said master switch.

34. In a gear shifter, an electric motor for operating the gear shifting mechanism; a motor controller for said motor, said controller including a rotary drum; a master switch for the motor circuit; a rotatable shaft for rotating said drum, said shaft being longitudinally shiftable for controlling the master switch; and means for both rotating and longitudinally shifting the shaft.

35. In a gear shifter for a motor vehicle in which the steering is accomplished by a steering wheel supported at the top of a steering column; an electric motor for operating the gear shifting mechanism; a motor controller for said motor; a master switch for closing the motor circuit for starting the motor; a shaft arranged parallel and adjacent to the steering column and adapted to set the controller by rotating and operate the master switch by shifting longitudinally; and a handle connected to said shaft and adapted to both rotate and shift it.

36. In a gear shifter, an electric motor for operating the gear shifting mechanism; a controller for said motor; a master switch for starting the motor; and two relatively movable coöperating members, the first of said members being adapted to move in one direction for setting said controller and in a substantially transverse direction for operating the master switch, and said members being interlocked against transverse movement except at predetermined relative positions.

37. In a gear shifter, an electric motor for operating the gear shifting mechanism; a controller for said motor; a master switch for starting the motor; a stationary segment; a handle movable relatively thereto, said handle being movable in one direction for pre-setting the controller and movable in a transverse direction for operating the master switch; and means for preventing the last mentioned movement of the handle except at predetermined stations.

38. In a gear shifter, an electric motor for operating the gear shifting mechanism; a controller for said motor; a master switch for starting the motor; a stationary segment; a handle movable relatively thereto, said handle being movable in one direction for pre-setting the controller and movable in a transverse direction for operating the master switch, said segment having notches at points corresponding to predetermined operative positions of the controller; and means on said handle for preventing movement in the last named direction except at said notches.

39. In a gear shifter, an electric motor for operating the gear shifting mechanism; a controller for said motor; a master switch for causing the motor to start; a rotatable shaft for setting said controller, said shaft being shiftable for controlling the master switch; a controller handle connected to said shaft for rotating and shifting it, and a yieldable lock for preventing accidental movement of said handle.

40. In a gear shifter, an electric motor for operating the gear shifting mechanism; a controller for said motor; a master switch for causing the motor to start; a rotatable shaft for setting said controller, said shaft being shiftable for controlling the master switch; a controller handle connected to said shaft at one end for rotating and shifting it; and a fulcrum concentric with the shaft for fulcruming the handle, whereby a movement of the free end of the handle in an axial direction shifts the shaft.

41. In a gear shifter, an electric motor for operating the gear shifting mechanism; a controller for said motor; a master switch for causing the motor to start; a rotatable shaft for setting said controller, said shaft being shiftable for controlling the master switch; a controller handle connected to said shaft at one end for rotating and shifting it; a fulcrum with the shaft for fulcruming the handle, whereby a movement of the free end of the handle in an axial direction shifts the shaft, a dial plate transverse to the axis of the shaft, said dial plate having notches at various operative positions of the controller; and a lug on the handle, the dial plate having a segmental edge lying between the controller handle and its lug whereby movement of the handle transverse to the plate is prevented except when the lug comes opposite to one of the notches in the plate.

42. In a combined gear shifting and clutch operating mechanism for motor vehicles, the combination of a lever for shifting the gears, a clutch operating device, a motor for actuating said lever and clutch-operating device; a reversing switch for the motor, electromagnetic means for operating said reversing switch, two controllers for said electromagnetic means, one of said controllers being actuated by the motor and the other manually, and manually operated means for shifting said lever in a direction transverse to the direction in which it is moved by said motor.

43. In a combined gear shifting and clutch operating mechanism for motor vehicles, the combination of a lever for shifting the gears; a clutch operating device; a motor for actuating said lever and clutch operating device; a guide having an H slot for guiding said lever; a reversing switch for the motor; electromagnetic means for operating said reversing switch; two controllers for said electromagnetic means, one of said controllers being actuated by the motor and the other manually; and manually operated spring mechanism for shifting said lever in a direction transverse to the direction in which it is moved by said motor, said spring mechanism being operative throughout the movement of the lever toward neutral position.

In witness whereof, I have hereunto subscribed my name.

HERMON L. VAN VALKENBURG.